United States Patent [19]

Heyne

[11] 4,208,237

[45] Jun. 17, 1980

[54] APPARATUS FOR FORMING AND APPLYING PLASTIC SLEEVES TO GLASS BOTTLES

[75] Inventor: Clarence A. Heyne, Sun City, Ariz.

[73] Assignee: Owens-Illinois, Inc., Toledo, Ohio

[21] Appl. No.: 957,790

[22] Filed: Nov. 6, 1978

[51] Int. Cl.² .............................................. B65C 3/12
[52] U.S. Cl. ..................................... 156/446; 156/456
[58] Field of Search ............... 156/443, 446, 218, 215, 156/86, 456; 53/139.3, 291, 292, 295–298, 198 R, 585, 587

[56] References Cited

U.S. PATENT DOCUMENTS

| | | | |
|---|---|---|---|
| 3,551,258 | 12/1970 | Galvanoni | 53/291 X |
| 3,974,628 | 8/1976 | Konstantin | 53/585 X |
| 4,016,704 | 4/1977 | Fujio | 53/585 X |
| 4,102,728 | 7/1978 | Smith | 156/443 X |

*Primary Examiner*—David A. Simmons

*Attorney, Agent, or Firm*—D. T. Innis; Myron E. Click; David H. Wilson

[57] ABSTRACT

The present invention relates to an apparatus for forming and applying a plastic sleeve to a rigid base article, such as a glass bottle. A blank of plastic is wrapped and seamed around the fingers of a stripper sleeve enclosing a mandrel. The stripper sleeve holding the plastic sleeve is extended along its longitudinal axis telescopically over a preheated bottle positioned above and longitudinally aligned with the mandrel and the stripper sleeve. Clamping means, such as a plurality of vacuum fingers, extend downwardly and hold the plastic sleeve in position while the stripper sleeve with its fingers is retracted to its original position. The heat of the bottle causes the plastic sleeve to shrink slightly such that it is held in position relative to the bottle when the clamping means is removed. The bottle and plastic sleeve are then subjected to a thermoconstrictive operation.

10 Claims, 8 Drawing Figures

APPARATUS FOR FORMING AND APPLYING PLASTIC SLEEVES TO GLASS BOTTLES

BACKGROUND OF THE INVENTION

1. Field of the Invention

This invention relates in general to a machine for making and applying a thin plastic covering to a rigid base article.

2. Description of the Prior Art

The prior art discloses two basic apparatuses for forming and applying a thin plastic covering to a rigid base article such that a subsequent thermoconstrictive process results in a tightly bonded plastic covering. U.S. Pat. No. 3,110,554, granted to K. Yazumi, discloses an apparatus for labeling packages. A thin plastic blank is processed into a tubular section using a heat sealing bar, for example. The diameter of the tubular section is only slightly larger than the diameter of the article to be covered. The section is then placed directly about the rigid body and a thermal operation contracts the plastic to make it adhere firmly to the surface of the rigid body.

U.S. Pat. No. 3,802,942, granted to S. W. Amberg et al., discloses another sleeve making apparatus. The thin plastic covering is supplied on a large web and cut into appropriately sized blanks. The plastic blanks are fed to a plastic sleeve forming means. The leading edge of the plastic blank is held to a cylindrical mandrel by the pressure differential created by the application of a vacuum through a plurality of vacuum ports formed in the mandrel and the external atmospheric pressure. The mandrel then rotates so as to wrap the plastic about the exterior surface of the mandrel. When a complete rotation is made, a heat sealing bar is supplied such that the ends of the plastic blank are sealed, forming a plastic sleeve. Then a preheated rigid base article is positioned above the mandrel such that their longitudinal axes coincide. A stripper sleeve, also longitudinally aligned but positioned below the mandrel, is raised upwardly until it engages the plastic sleeve and pushes it telescopically onto the rigid base article. The heat retained in the article causes the plastic sleeve to shrink slightly such that it remains in position relative to the article after the stripper sleeve is retracted. The article with its plastic covering is then subjected to the final thermoconstrictive process.

SUMMARY OF THE INVENTION

The present invention relates to an improved apparatus for forming and applying a thin plastic covering of, for example, polystyrene to a rigid base article, such as a glass bottle. The present invention avoids prior problems encountered with thin plastic coverings, chiefly wrinkling or binding in the transfer from the forming means to the rigid base article, by employing a stripper sleeve having fingers upon which the plastic sleeve is formed.

Plastic material is cut into proper lengths and wrapped around the thin fingers of a stripper sleeve enclosing a mandrel. The plastic is sealed at the overlapping edges to form a plastic sleeve. A preheated bottle is positioned above the mandrel and the stripper sleeve such that their longitudinal axes coincide. The stripper sleeve is raised upwardly such that its thin fingers and the surrounding plastic sleeve are extended off the mandrel telescopically over the bottle. Clamping means are extended downwardly and engage the exterior surface of the plastic sleeve to hold it in the desired position relative to the bottle while the stripper sleeve fingers are retracted from beneath the plastic sleeve. The retained heat in the bottle shrinks the plastic sleeve slightly such that when the clamping means is removed, the plastic sleeve remains in position.

It is, therefore, an object of this invention to reduce wrinkling and binding in the application of a thin plastic sleeve to a rigid base article.

It is also an object of this invention to increase the efficiency and reduce the cost of making glass bottles having a plastic sleeve covering.

It is a further object of this invention to operate compatibly with existing machinery designed to produce such plastic covered articles.

DETAILED DESCRIPTION OF THE INVENTION

Figure 1:
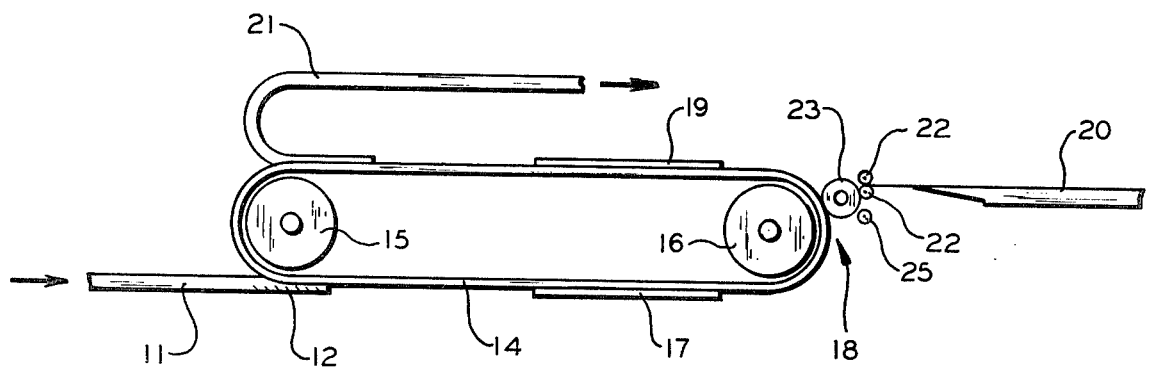
FIG. 1 is a plan view of an apparatus for forming and applying a plastic sleeve to a glass bottle in accordance with the present invention.

The present invention is an improvement in an apparatus for forming and applying a plastic sleeve to a rigid base article such as a glass bottle. The individual machine component movements can be controlled by any suitable means. For example, U.S. Pat. No. 3,802,942 discloses a machine for producing plastic covered glass containers and a detailed description of the machine components and their operation will not be presented here. Such a machine, including the present invention, is shown schematically in plan view in FIGS. 1 and 2. Bottles are fed into the machine on a conveyor 11. An infeed timing worm 12 spaces the bottles in accordance with the center spacing on overhead bottle chucks 13, the chucks being illustrated in FIGS. 5 through 8. The chucks 13 travel on a driven endless carriage 14 along a path defined by a pair of machine sprockets 15 and 16, through a preheater oven 17 if necessary, past a plastic sleeve assembly station 18, and then into and through a tunnel oven 19 for the thermoconstrictive treatment of the bottle and its plastic covering. The chuck 13 then deposits the bottle on an unloading conveyor 21.

Figure 2:
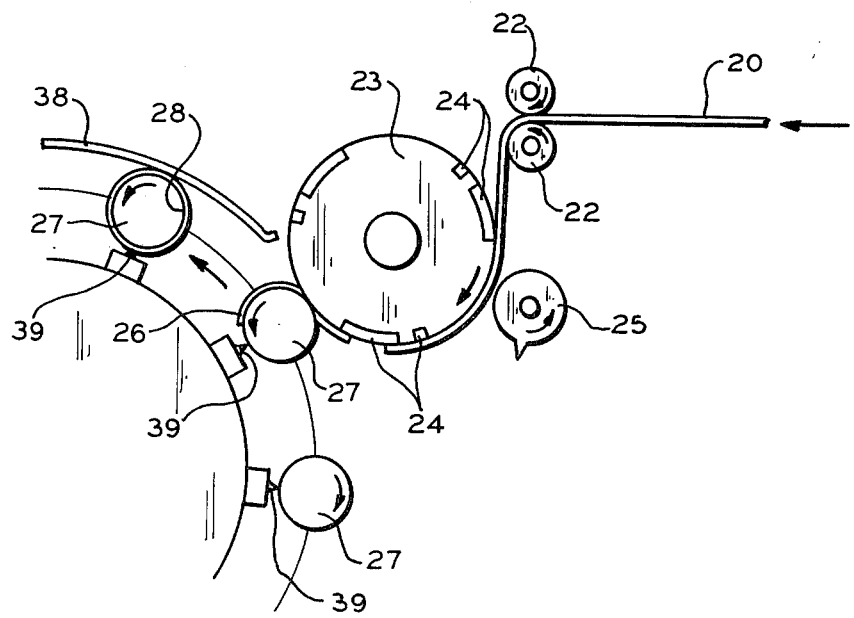
FIG. 2 is an enlarged plan veiw illustrating the bottle wrapping portion of the apparatus of FIG. 1.

FIG. 2 schematically illustrates the plastic sleeve forming station 18. A web 20 of prepared plastic, shown with exaggerated thickness, is guided between a pair of feed rollers 22 onto a rotating feed drum 23. A plurality of small ports 24 in the feed drum 23 are connected to a vacuum source (not shown) to create a pressure differential with the external atmosphere to hold the plastic web 20 on the feed drum 23. A rotating knifeblade 25 cuts the web 20 into desired length blanks 26. Each plastic blank 26 is wound on a separate rotating mandrel 27 and seamed at an end-to-end overlap region to form a plastic sleeve 28. A plurality of the mandrels 27 move synchronously with the bottles on the carriage 14 along parallel paths sharing a common longitudinal axis. The plastic sleeve 28 is stripped from the mandrel 27 and telescoped over the bottle. The retained heat in the preheated bottle shrinks the sleeve to maintain it in position for the thermoconstrictive treatment.

Figure 3:
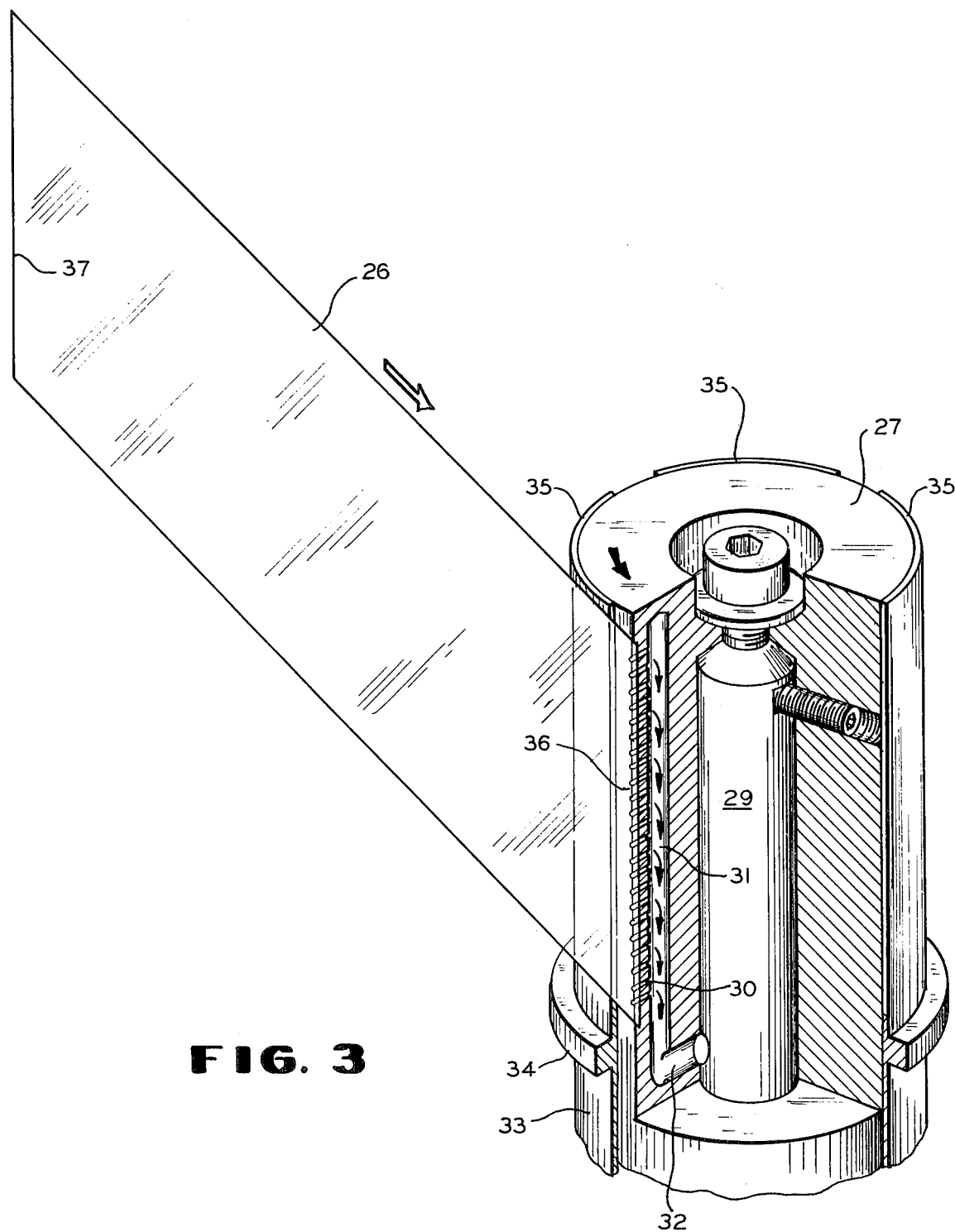
FIG. 3 is a perspective view of the plastic blank being wrapped around the fingers of the stripping sleeve and the mandrel in the apparatus of FIG. 2.

The present invention concerns an improvement in the plastic sleeve forming and applying station 18. FIG. 3 illustrates the mandrel 27 mounted on a vertical shaft 29 which rotates the mandrel 27 about its own longitudinal axis. A plurality of vertically positioned vacuum ports 30 are formed at the periphery of the mandrel 27. Each vacuum port 30 is connected to a vacuum source (not shown) through an internal chamber 31. The chamber 31 is connected through a radial port 32 to a vertical passage (not shown) in the shaft 29. Although only one row of vacuum ports 30 is shown, two or more rows can be used.

A stripper sleeve 33 is formed about the mandrel 27 and includes a collar 34 with a plurality of fingers 35 formed along an upper edge thereof. The fingers 35 extend parallel to the longitudinal axis of the mandrel 27 such that the plastic blank 26 is wound over them. In the preferred embodiment, four equally spaced fingers 35 are used, although more or less could be utilized. As the plastic blank 26 is fed off the feed drum 23, a leading edge 36 is held to the mandrel 27 by the pressure differential between the external atmospheric pressure and the vacuum at the vacuum ports 30. The mandrel is now at the beginning of the wind operation and rotates in a counter-clockwise direction when viewed from the top. The plastic blank 26 is wrapped about the mandrel 27 and the fingers 35 of the stripper sleeve 33 such that a trailing edge 37 of the blank 26 overlaps the leading edge 36. Throughout the wind operation, the vacuum applied to the vacuum ports 29 is maintained. Also, to insure a tight and even wrap, the plastic blank 26 is held against the mandrel 27 and the fingers 35 by a stationary winding plate 38 (shown in FIG. 2) which is supported on the frame of the machine.

Figure 4:
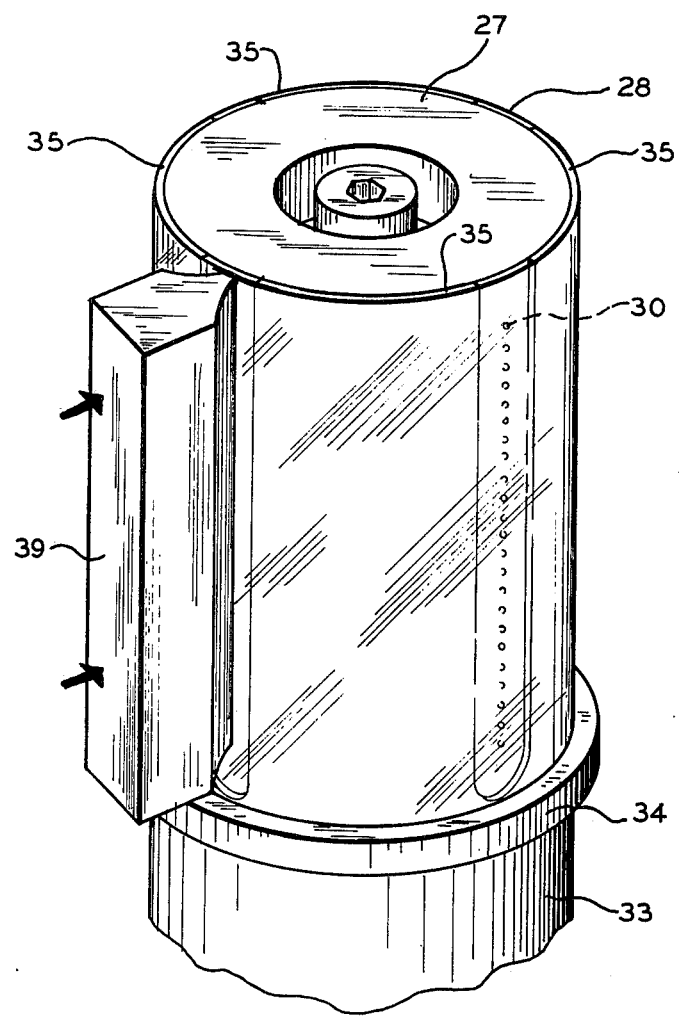
FIG. 4 is a perspective view of the heat sealing bar and the mandrel of FIG. 2.

The rotation of the mandrel 27 is designed to advance the leading edge 36 of each plastic blank 26 to a point opposite a heat sealing bar 39 such that the trailing edge 37 overlaps the leading edge 36, as illustrated in FIG. 4. A heat sealing bar 39 is located adjacent each mandrel 27. When the winding of the plastic blank 26 is completed, the heat sealing bar 39 is moved against the overlapping edges of the blank 26. The heat and the pressure of the heat sealing bar 39 against the blank 26 seals the edges together to form a plastic sleeve 28. The bar 39 is then retracted in preparation for the next operation.

Figure 5:
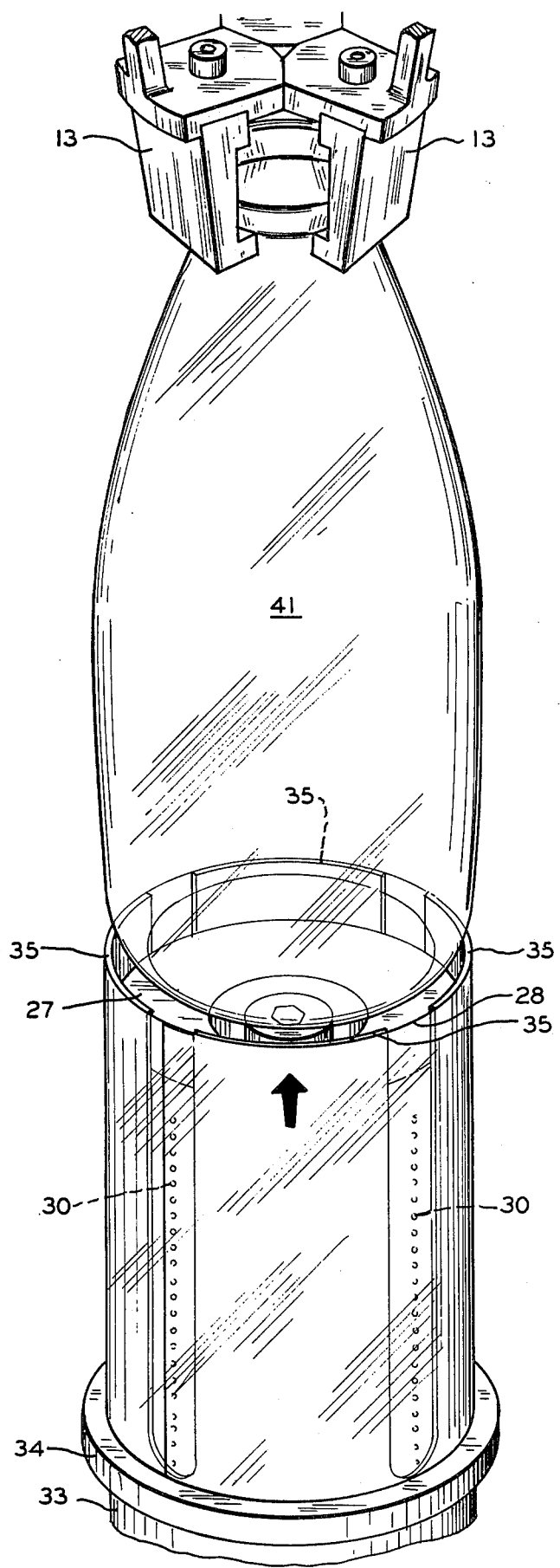
FIG. 5 is a perspective view of a bottle and a plastic sleeve being telescoped over the bottle in accordance with the present invention.

Following the winding and sealing operations, the plastic sleeve 28 is ready to be telescoped onto the bottle. Referring to FIG. 5, a preheated bottle 41 is moved into position above the mandrel 27 and the plastic sleeve 28. These elements are synchronized such that they are axially aligned and travel at zero velocity relative to each other. The source of vacuum applied to the ports 30 is disconnected in preparation for an ejection operation.

Figure 6:
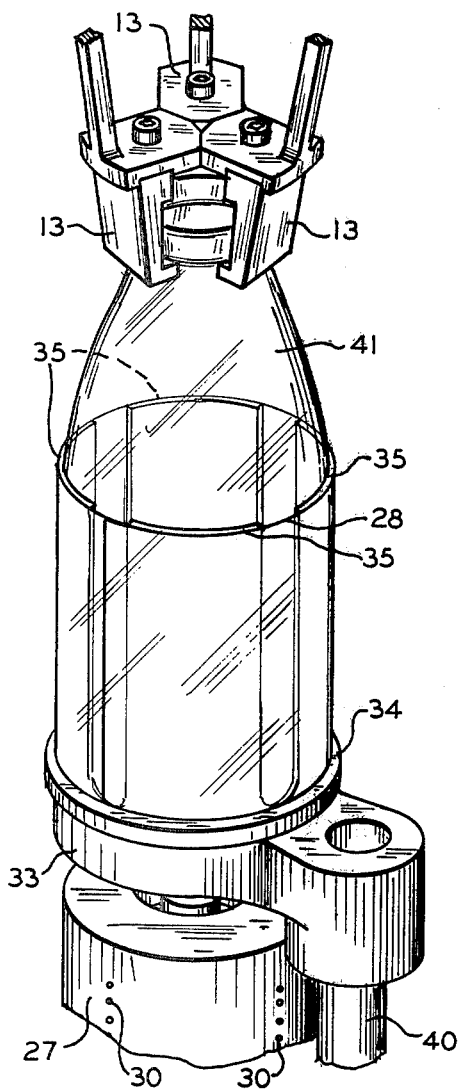
FIG. 6 is a perspective view of the plastic sleeve and the bottle of FIG. 5 in registry.

The ejection operation begins with an actuator rod 40 (see FIG. 6) attached to the stripper sleeve 33 is actuated. The rod 40 is extended upwardly to raise the stripper sleeve 33 such that the fingers 35 and surrounding plastic sleeve 28 are telescoped over the bottle 41, as illustrated in FIG. 6. The collar 34 prevents the plastic sleeve 28 from slipping off of the fingers 35. The plastic sleeve 28 is now ready to be transferred to the bottle 41.

Figure 7:
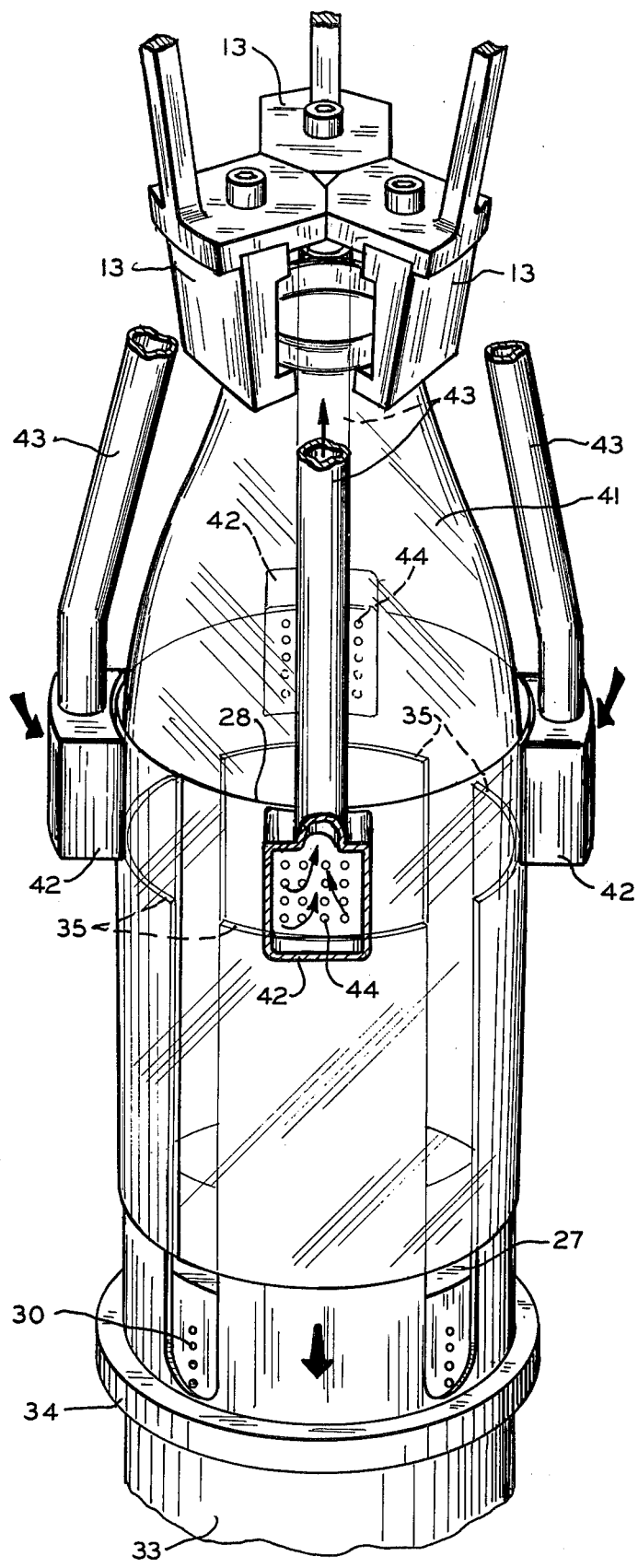
FIG. 7 is a perspective view of vacuum fingers holding the plastic sleeve in registry with the bottle as the stripping sleeve is being retracted.
Figure 8:
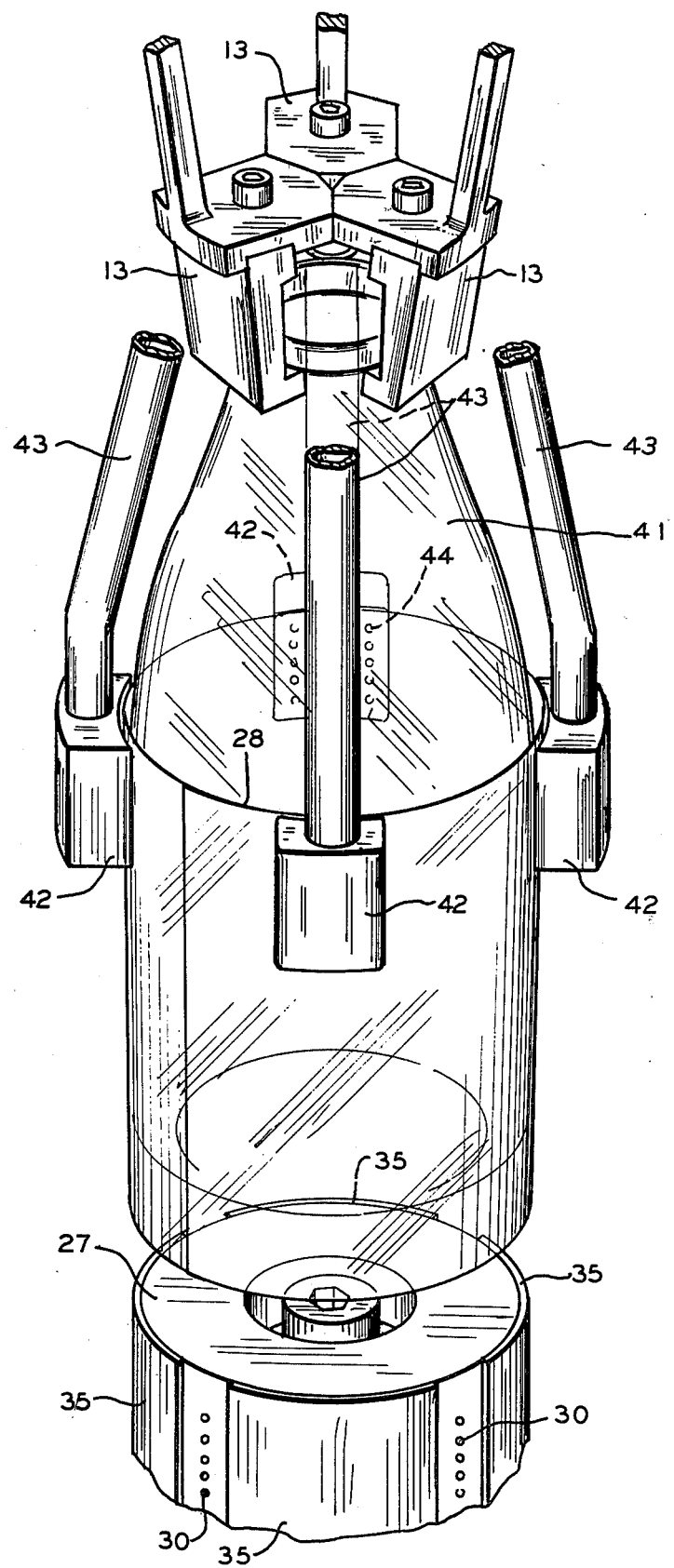
FIG. 8 is a perspective view showing the fingers of the stripper sleeve in FIG. 7 completely retracted.

A clamping means is employed to maintain the position of the sleeve 28 over the bottle 41 while the stripper sleeve 33 is removed. In the preferred embodiment, the clamping means includes a plurality of vacuum fingers 42 extending downwardly, as illustrated in FIG. 7. Each vacuum finger 42 is connected to a rigid hollow positioning rod 43 which controls the position of the vacuum finger 42 and is also connected to a source of vacuum (not shown) so as to provide vacuum at a plurality of ports 44 in the finger 42. In the preferred embodiment, there is a vacuum finger 42 for each stripper finger 35, but any suitable number can be used. The vacuum fingers 42 engage and hold the plastic sleeve 28 in the desired position with respect to the bottle 41 while the fingers 35 of the stripper sleeve 33 are axially retracted to their original position about the mandrel 27, as illustrated in FIG. 8. When the stripper sleeve 33 is completely retracted to remove the fingers 35 from between the plastic sleeve 28 and the bottle 41, the vacuum fingers 42 are retracted to their original inactive position. The heat retained in the bottle 41 preshrinks the plastic sleeve 28 enough to hold the plastic sleeve 28 in position until it is subjected to the final thermoconstructive process.

In summary, the present invention concerns an apparatus for forming plastic sleeves and applying them to rigid base articles such as glass bottles. The apparatus includes a mandrel, means for forming the plastic sleeve about the mandrel, means for positioning the glass bottle adjacent the mandrel at one end of the plastic sleeve, and means for telescoping the plastic sleeve onto the glass bottle. The telescoping means including a stripper sleeve having a plurality of elongated fingers disposed about the periphery of the mandrel interposed between the mandrel and the plastic sleeve, means for moving the stripper sleeve and the plastic sleeve from the mandrel and telescoping them over the glass bottle, and means for clamping the plastic sleeve in position with respect to the glass bottle while the moving means retracts the stripper sleeve from the glass bottle. The stripper sleeve includes a collar for engaging the other end of the plastic sleeve with the plurality of fingers extending from the collar. The clamping means includes a plastic sleeve engaging means having a plurality of apertures formed therein being in fluid communication with the vacuum source.

In accordance with the provisions of the patent statutes, the principle and mode of operation of the invention have been explained and illustrated in its preferred embodiment. However, it must be understood that the invention may be practiced otherwise than as specifically illustrated and described without departing from its spirit or scope.

What is claimed is:

1. In an apparatus for forming plastic sleeves and placing them about the periphery of rigid base articles, the apparatus including a mandrel, means for forming the plastic sleeve about the mandrel, means for positioning the rigid base article adjacent the mandrel at one end of the plastic sleeve, and means for telescoping the plastic sleeve onto the rigid base article, the telescoping means comprising:

a stripper sleeve having a plurality of elongated fingers disposed about the periphery of the mandrel interposed between the mandrel and the plastic sleeve;

means for moving said stripper sleeve and the plastic sleeve in one direction from the mandrel and telescoping said stripper sleeve and the plastic sleeve over the rigid base article; and means for retracting said stripper sleeve in a direction opposite said one direction away from the rigid base article and the plastic sleeve telescopically located thereon, whereby said stripper sleeve and said fingers are removed from between the plastic sleeve and the rigid base article.

2. In an apparatus for forming plastic sleeves and placing them about the periphery of rigid base articles, the apparatus including a mandrel, means for forming the plastic sleeve about the mandrel, means for positioning the rigid base article adjacent the mandrel at one end of the plastic sleeve, and means for telescoping the plastic sleeve onto the rigid base article, the telescoping means comprising:

a stripper sleeve having a plurality of elongated fingers disposed about the periphery of the mandrel interposed between the mandrel and the plastic sleeve, said stripper sleeve including a base attached to said moving means and a collar formed about said base for supporting the other end of the plastic sleeve and wherein said fingers extend from said base at said collar;

means for moving said stripper sleeve and the plastic sleeve from the mandrel and telescoping said stripper sleeve and the plastic sleeve from the mandrel and telescoping said stripper sleeve and the plastic sleeve over the rigid base article; and means for retracting said stripper sleeve away from the rigid base article and the plastic sleeve telescopically located thereon, whereby said stripper sleeve and said fingers are removed from between the plastic sleeve and the rigid base article.

3. An apparatus according to claim 1 or 2 including means for clamping the plastic sleeve in its telescopic position with respect to the rigid base article while said stripper sleeve is being retracted.

4. An apparatus according to claim 3 wherein said clamping means includes at least one vacuum finger for engaging the exterior surface of the plastic sleeve.

5. An apparatus according to claim 4 wherein said vacuum finger has a plurality of apertures formed in the sleeve engaging surface and said apertures are in fluid communication with a fluid source at less than atmospheric pressure.

6. An apparatus for forming a plastic sleeve and attaching it to a glass bottle comprising:

a mandrel;

means for forming the plastic sleeve about the mandrel;

a stripper sleeve having a plurality of elongated fingers disposed about the periphery of the mandrel interposed between the mandrel and the plastic sleeve;

means for positioning the glass bottle adjacent the mandrel at one end of the plastic sleeve;

means for moving said stripper sleeve to telescope said stripper sleeve and the plastic sleeve over the glass bottle; and means for clamping the plastic sleeve in position with respect to the glass bottle as said moving means retracts said stripper sleeve from the glass bottle.

7. An apparatus according to claim 6 wherein said stripper sleeve includes a collar for engaging the other end of the plastic sleeve, said collar having said plurality of fingers extending therefrom.

8. An apparatus according to claim 6 wherein said clamping means includes a plastic sleeve engaging means having a plurality of apertures formed therein, said apertures being in fluid communication with a vacuum source.

9. In an apparatus for forming plastic sleeves and placing them about the periphery of rigid base articles, the apparatus including a mandrel, means for forming the plastic sleeve about the mandrel, means for positioning the rigid base article adjacent the mandrel at one end of the plastic sleeve, and means for telescoping the plastic sleeve onto the rigid base article, the telescoping means comprising:

a stripper sleeve having a plurality of elongated fingers disposed about the periphery of the mandrel interposed between the mandrel and the plastic sleeve;

means for moving said stripper sleeve and the plastic sleeve from the mandrel and telescoping said stripper sleeve and the plastic sleeve over the rigid base article; and means for clamping the plastic sleeve in its telescopic position with respect to the rigid base article while said stripper sleeve moving means retracts said stripper sleeve from the rigid base article whereby said stripper sleeve fingers are removed from between the plastic sleeve and the rigid base article.

10. An apparatus according to claim 9 wherein said clamping means includes a plurality of vacuum fingers for engaging the exterior surface of the plastic sleeve, each of said vacuum fingers having a plurality of apertures formed in the sleeve engaging surface, said apertures being in fluid communication with a fluid source at less than atmospheric pressure.

* * * * *